United States Patent Office 3,378,110
Patented Apr. 16, 1968

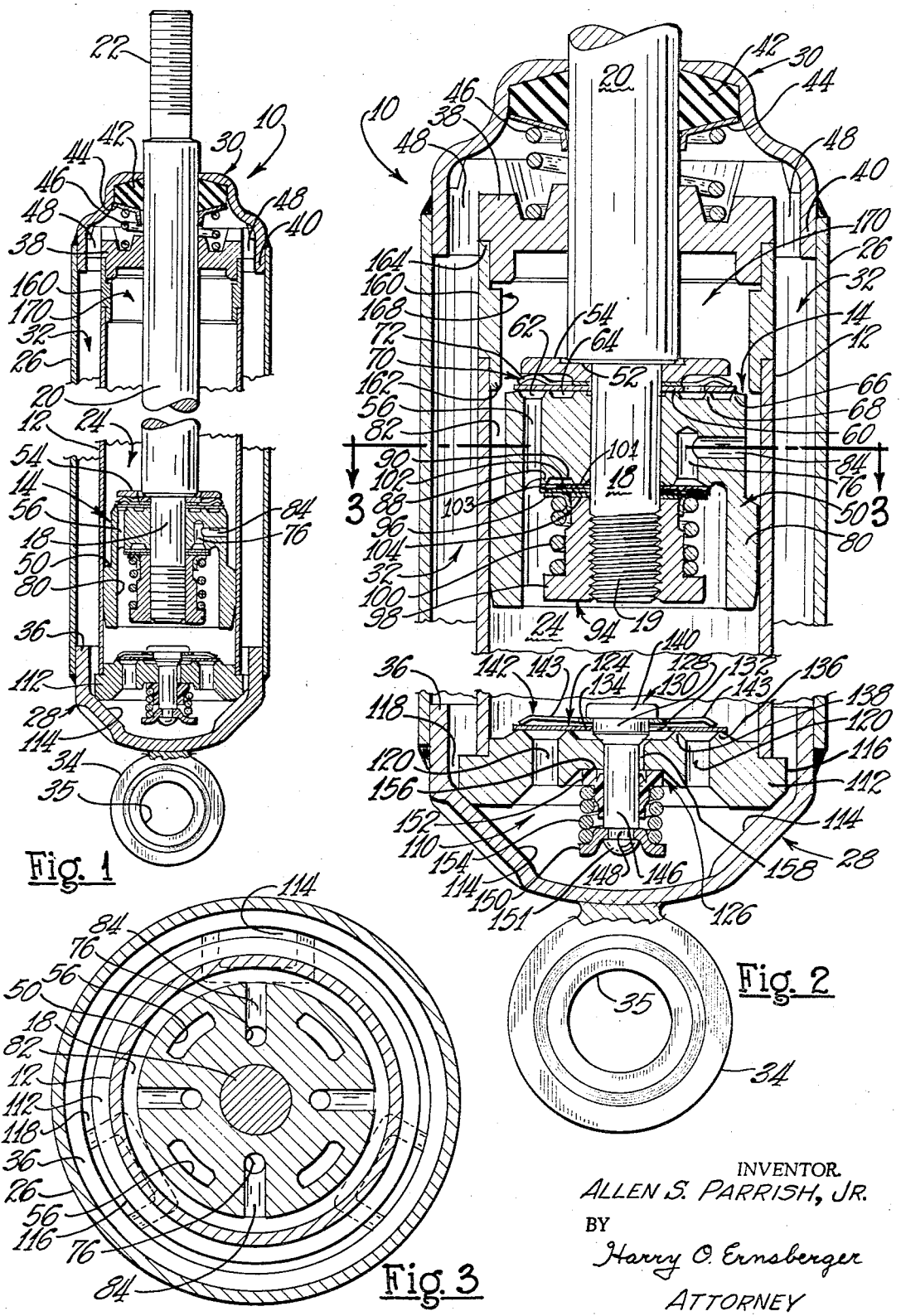

3,378,110
SHOCK ABSORBER
Allen S. Parrish, Jr., Dyersburg, Tenn., assignor to Oldberg Manufacturing Company, Grand Haven, Mich., a corporation of Michigan
Filed Mar. 4, 1966, Ser. No. 531,890
6 Claims. (Cl. 188—88)

ABSTRACT OF THE DISCLOSURE

This invention relates to a double acting shock absorber having a working chamber and a reservoir chamber, the working chamber embodying a hydraulic recoil or rebound chamber in conjunction with a one-piece piston having bypass channels in the piston adapted to be cut off or closed when the piston approaches the recoil end of the working chamber to establish increased hydraulic resistance to cushion the recoil or rebound.

---

This invention relates to a direct double acting hydraulic shock absorber of the two tube type and more particularly to a shock absorber of this character embodying a hydraulic recoil stop means or rebound cut-off effective on the recoil or extension stroke of the shock absorber.

It has been a conventional practice for manufacturers of automotive vehicles to equip the vehicle with rubber recoil bumpers serving as a movement limiting means to prevent direct contact between a control member of the spring suspension of the vehicle and the frame to cushion the shock of "bottoming" of the suspension system. Developments have been made incorporating in a hydraulic shock absorber an arrangement for limiting rebound or recoil action of the suspension system by hydraulic means in lieu of recoil or jounce bumpers.

The present invention embraces a double acting hydraulic shock absorber embodying an arrangement providing a hydraulic recoil or extension movement limiting means effective during a recoil stroke of the shock absorber to substantially increase hydraulic resistance to the movement of the shock absorber piston whereby to prevent impact engagement of the piston with the end of the shock absorber cylinder.

An object of the invention is the provision of a double acting hydraulic shock absorber embodying a piston having bypass channels arranged for cooperation with a cut-off sleeve at the end region of the working chamber or cylinder effective on a recoil or extension stroke of the piston to establish a hydraulic cushion or block between the piston and the end of the shock absorber cylinder which is effective in operation and which may be embodied in a shock absorber at comparatively low cost.

Another object of the invention is the provision in a hydraulic shock absorber of a one-piece piston having bypass channels adapted to be closed when the piston approaches the recoil end of the working chamber to establish greatly increased hydraulic resistance to cushion the recoil.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a longitudinal sectional view of a hydraulic shock absorber embodying the invention;

FIGURE 2 is an enlarged longitudinal sectional view of the shock absorber illustrated in FIGURE 1 showing the position of the piston at the initiation of hydraulic rebound cut-off, and FIGURE 3 is a sectional view taken substantially on the line 3—3 of FIGURE 2.

Referring to the drawings in detail, the shock absorber 10 illustrated is of the hydraulic, direct acting, double tube type and is inclusive of a tubular member or cylinder 12 in which is slidably disposed a piston and piston valve construction which is secured on a tenon 18 formed on one end of a piston rod 20, the upper end of the rod 20 being provided with an extension 22 adapted to be secured to the frame construction of the vehicle with which the shock absorber may be used.

The cylinder 12, providing a working chamber 24, is surrounded by a second tubular member or cylinder 26 preferably concentric with the cylinder 12 and which, in conjunction with end caps 28 and 30, forms a fluid reserve chamber or reservoir 32. Welded to the lower end cap 28 is a mounting member 34 provided with an annular grommet or bushing 35 adapted to accommodate means (not shown) for connecting the lower end of the shock absorber to a vehicle wheel supporting means or axle of conventional construction. The cap 28 is fashioned with a peripheral flange 36 telescoped into the end of the cylinder 26 and is welded throughout its periphery to the lower end of the cylinder.

Mounted at the upper end of the working cylinder 12 is a closure 38 having a portion centered within the inner surface of a flange 40 on the cap 30, the outer surface of the flange 40 being telescoped with and welded to the reservoir cylinder 26. The member 38 provides an end wall for the upper end region of the working chamber 24.

The closure 38 has an opening accomodating the piston rod 20. Disposed within the cap member 30 is a packing gland or sealing member 42 snugly engaging the piston rod to prevent leakage of fluid along the rod. A metal washer 44 engages the lower surface of the sealing member 42 and an expansive coil spring 46, disposed between the piston guide bushing or closure 38 and the washer 44, exerts pressure or stress on the sealing member 42 to effect sealing engagement of the member with the piston rod 20. The bushing 38 is fashioned with peripherally spaced notches or open areas 48 to facilitate the return of fluid, which seeps between the piston rod 20 and the closure 38, to the reserve chamber 32. Through this arrangement there is no loss of fluid, but as the piston rod 20 is slidable in the closure 38, some fluid seeps along the rod 20 and the fluid return notches 48 prevent the region between the piston construction and the bushing 38 becoming air bound.

The piston and piston valve construction is inclusive of a piston 50 fashioned as a single body or one-piece member. The piston 50 is preferably formed of sintered iron, molded or pressed to the desired shape. Disposed on the piston tenon 18 and engaging the shoulder 52 is an abutment plate 54. The piston 50 is fashioned with lengthwise arranged passages or channels 56 preferably spaced in 90° relationship.

Disposed on the upper surface of the piston 50 is a valve member 60 in the form of a circular disc of flexible metal, the valve disc having a central opening accommodating the tenon 18 on the rod 20. The upper ends of the passages 56 in the piston open into a circular recess 62 formed in the piston. The upper surface of the piston is fashioned with a second circular groove or recess 64. The circular recesses 62 and 64 define circular concentric lands 66 and 68 which form a seating means for the valve disc 60. The valve 60 normally engages the circular lands 66 and 68 to close the passages 56.

Disposed between the circular disc valve 60 and the abutment plate or member 54 is a plate spring 70 fashioned with radially extending flexible fingers 72 normally biasing the disc valve 60 to closed position. The disc valve provides for fluid flow in one direction through the passages 56. Thus, when the piston 50 moves downwardly in the working chamber 24, fluid pressure developed below the piston exerts pressure on the disc valve 60 at the areas of the passages 56, elevating the valve to accommodate flow of fluid upwardly through the passages 56 to the region above the piston.

As shown in FIGURE 3, the passages 56 are of substantial area to facilitate rapid transfer of fluid from the zone beneath the piston to the zone above the piston when sufficient fluid pressure is developed to effect opening of the disc valve 60.

The piston 50 is fashioned with a plurality of circumferentially arranged passages 76 disposed lengthwise of the piston and extending only partially through the piston. While four passages 76 have been illustrated, it is to be understood that a greater or lesser number may be used depending upon the extent or restriction of fluid flow desired.

The piston 50 is fashioned with a depending skirt portion 80, which is snugly, yet slidably fitted into the working cylinder 12. The upper portion of the piston 50 is of reduced diameter providing an annular space 82 for a purpose hereinafter described. The portion of the piston of reduced diameter is provided with transverse, radially arranged passages or channels 84 which are in registration with the passages 76 in the piston, the transverse passages and passages 76 providing for fluid flow from the zone above the piston to the zone beneath the piston under conditions hereinafter described.

The piston 50 is equipped with valve means to control flow of fluid from the region above the piston to the region below the piston. The lower surface of the piston is provided with a circular land 88 which is defined by a circular recess 90, shown in FIGURE 2. The circular land 88 is engaged by a bleed disc 101, and a recoil valve disc 102 is disposed contiguous therewith. The disc 101 has two or more circumferentially spaced bleed openings 103, one of which is shown in FIGURE 2. The bleed openings 103 provide for restricted flow for low velocity rebound control.

Threaded upon a threaded portion 19 of the tenon 18 is a nut 94. Surrounding the upper portion of the nut 94 is an annular member or spring retainer 96 and disposed between the retainer 96 and a flange 98 on the nut 94 is a comparatively strong expansive coil spring 100.

The annular spring retainer 96 engages a recoil disc valve 102. The expansive pressure of the spring 100 normally holds the recoil disc valve 102 in closed position. Disposed between the nut 94 and the disc valve 102 is an annular washer or gasket 104 to facilitate drawing up the nut 94 without damage to the valve 102.

The shock absorber includes a base valve or rod displacement valve construction 110, particularly shown in FIGURE 2, for controlling fluid flow between the working chamber 24 provided by the cylinder 12 and reservoir chamber 32. The base valve construction is inclusive of a valve plate or body 112, preferably made of sintered metal. The end cap 28 is fashioned with three circumferentially spaced raised portions 114 which provide seats for the valve plate 112. The exterior peripheral surface 116 of the valve plate is of lesser diameter than the interior diameter of portion 36 of the cap providing a circular passage 118. The raised portions 114 form passages in communication with the circular passage 118 to facilitate fluid flow into and out of the reservoir chamber 32 with minimum resistance. A portion of the plate 112 is pressed into the lower end of the working cylinder 12. The plate 112 is formed with a plurality of circumferentially arranged passages 120.

The base valve construction embodies two valve means, a first valve means 124 mounted above the body or plate 112 for the purpose of admitting flow of liquid from the reserve chamber 32 into the working chamber 24 in the region between the piston and base valve construction as the piston rod is extended upwardly in the working cylinder. The second valve means 126 is arranged at the opposite or lower side of the body 112. The first valve 124 is of disc-like shape and has a central opening accommodating an enlarged portion 128 of a rivet 130.

The disc-valve 124 is fashioned with segmentally-shaped open areas 132, one of which is shown in FIGURE 2, the open areas being defined by inwardly extending tabs or lugs 134, one of which is shown in FIGURE 2, the lugs engaging the portion 128 of the rivet to center the disc valve.

The body 112 is fashioned with concentric circular lands or ridges 136 and 138 which form seats for the valve 124 in the manner shown in FIGURE 2. Disposed between the head 140 of the rivet 130 and the valve 124 is a resilient member or plate spring 142 having an annular central hub received on the portion 128 of the rivet.

The resilient member or spring 142 is preferably star-shaped having resilient fingers 143 engaging and biasing the valve 124 toward closed position in engagement with circular seats 136 and 138.

The passages 132 in the disc valve 124, provide for fluid flow under conditions hereinafter described. The circular valve seat 136 or 138 may be formed with one or more notches (not shown) to provide restricted passage means to permit restricted flow of fluid out of the working chamber 24 during a compression stroke.

The second valve means 126 is arranged to control flow of fluid from the working chamber through the base valve construction during a compression stroke of high velocity. The valve 126 is of generally annular shape and the central opening in the valve accommodates the shank 146 of the rivet 130, the valve 126 being slidable on the rivet shank. The valve 126 is preferably formed of nonmetallic material such as reinforced resinous plastic. The shank 146 of the rivet is provided with a circular recess 148 accommodating a spring seat or retainer 150, the end region of the shank being swaged as shown at 151 for securing the retainer 150 on the rivet.

Disposed between a flange 152 on the valve 126 and the retainer 150 is an expansive coil spring 154 normally biasing the valve 126 to seat in closed position against a planar surface 156 of the body 112. The body is fashioned with a slotted bore to accommodate the shank 146 of the rivet. Surrounding this bore are recessed regions 158, there being preferably three recessed regions equally spaced circumferentially around the rivet shank 146, one of the recesses 158 being shown in FIGURE 2.

The recesses or slots 158 are of a depth and width to secure desired flow or transfer of fluid from the region above the base valve to the reserve chamber 32 during "blow-off," that is, when the valve 126 is opened by reason of the piston rod 20 entering the working cylinder 12 to displace an equivalent volume of working fluid from the working chamber during a compression stroke especially under high velocity piston rod movement.

The shock absorber construction of the invention is inclusive of means for establishing increasing hydraulic resistance during the recoil or extension stroke of the piston whereby as the piston approaches its maximum recoil position, a hydraulic block or lock is established to effectively restrict or impede further relative movement of the piston in the recoil direction. Disposed between the upper end of the working cylinder 12 and the closure or rod guide 38 is a sleeve or cylindrical member 160. A portion 162 of the sleeve 160 is in overlapping relation with the cylinder 12 and is pressed into the cylinder. A portion 164 of the sleeve is pressed onto a circular rim on the rod guide 38. The interior cylindrical surface 168 of the sleeve 160 is of a diameter to snugly, yet slidably, accommodate the upper portion of the piston 14. Thus, the sleeve 160 provides a region 170 in which fluid is entrapped when the upper portion of the piston enters the sleeve 160 during a recoil stroke.

As the upper portion of the piston 14 moves into the sleeve 160, the fluid moves through the minute clearance space between the piston and sleeve at a comparatively slow rate and fluid pressure is increased in the annular space 82 to an extent causing the valve 102 to open and permit fluid flow through the interconnected passages 76 and 84 to the region beneath the piston. When the piston moves to a position wherein the sleeve 160 covers the passages 84, fluid is entrapped in the region 170 restricting further movement in a recoil direction between the piston and the working cylinder.

Thus a hydraulic or fluid block is established providing a stop means or recoil cut-off to prevent "bottoming out" of the shock absorber even under extremely severe recoil forces. When the passages 84 are covered by the sleeve 160, further flow of fluid out of the region 170 is impeded except for minute flow occurring betwen the piston and the interior walls of the sleeve and the working cylinder 12.

The operation of the shock absorber construction embodying the hydraulic recoil cut-off is as follows: Upon the vehicle wheel encountering a substantial obstruction in the roadway, the vehicle wheel is forced upwardly and the fluid within the working cylinder is subjected to high compression forces as successive increments of the piston rod move into the working cylinder.

The fluid between the base valve construction 110 and the piston 14 is forced through the passages 56 in the piston, the hydraulic pressure causing the disc valve 60 to be flexed upwardly to open position permitting passage of fluid past the valve into the region above the piston.

With reference to the base valve arrangement 110, the hydraulic pressure acts upon the sleeve valve 126 to compress the spring 154, the valve sliding along the shank 146 of the rivet 130 to open position whereby liquid flows from the working chamber 24 into the reserve chamber 32 through the metering passages 158 adjacent the shank of the rivet, past the valve 126, thence through the space 118 into the reserve chamber 32.

The force of the spring 154, normally biasing the sleeve valve 126 toward closed position, is comparatively strong requiring comparatively high fluid pressure within the working chamber to unseat the valve 126 and permit return to the reserve chamber of fluid in excess of the quantity of fluid which flows into the rod end through the passages 56, the valve 60 on the piston being opened by fluid pressure to facilitate rapid flow of fluid from the region below the piston into the rod end region of the working chamber.

Through this valve arrangement, predetermined resistance to flow of liquid past the "blow-off" valve 126 is provided. The valve 126 provides a controlled pressure relief means resisting relative movement of the piston toward the base valve assembly on compression strokes to assure effective transfer of liquid into the rod end of the working cylinder.

The flow path of the fluid on a recoil or extension stroke as separation movement occurs between the piston and base valve assembly is as follows: As the piston rod is withdrawn from the working cylinder increasing the volume within the working cylinder, flow of liquid takes place through the annular space 82 surrounding the upper piston 72 through the interconnecting passages 76 and 84 past the disc valve 102, opened by the hydraulic pressure, to the region in the working cylinder beneath the piston.

As the volume of the working cylinder increases by withdrawal movement of the piston rod, liquid from the reserve chamber 32 flows through the space 118 opening the disc valve 124 by moving the same upwardly due to reduced pressure between the base valve assembly and the piston to admit liquid through the passages 120 past the disc valve 124 to fill the enlarging volume in the working cylinder. As the upper portion of the piston 14 enters the region 170 defined by the sleeve 160, liquid flow out of the region 170 is impeded in a manner hereinbefore described forming a hydraulic block or recoil stop to prevent the piston from bottoming out at the upper end of the shock absorber. Immediately upon reverse movement of the piston 14, that is, toward the base valve assembly, the disc valve 60 opens to admit fluid flow through the passages 56 in the piston.

It is apparent that, within the scope of the invention, modifications and different arrangements may be made other than as herein disclosed, and the present disclosure is illustrative merely, the invention comprehending all variations thereof.

I claim:

1. In a hydraulic shock absorber, the combination of a first tubular means providing a working chamber, a second tubular means surrounding and spaced from the first tubular means and providing therewith a reserve chamber, end caps secured to the ends of the second tubular means, a piston comprising a single body of metal reciprocable in said first tubular means, an end closure for one end of the first tubular means, a rod connected with the piston extending through openings in the end closure and the adjacent end cap, base valve means at the opposite end of the first tubular means providing for controlled transfer of liquid between the working chamber and the reserve chamber, a region of the first tubular means adjacent the rod end closure being of lesser diameter adjacent the remainder of the working chamber providing a recoil chamber, said piston having a portion of a diameter to be received in the rceoil chamber, first passage means in the piston body disposed lengthwise thereof, first valve means for said first passage means, second passage means disposed lengthwise in the piston body extending partially through the body, transverse passages in the portion of the piston received in the recoil chamber in communication with the second passage means, and second valve means for the second passage means.

2. The combination according to claim 1 wherein the transverse passages are disposed whereby partial entrance of the piston into the recoil chamber covers the entrances of the transverse passages and entrap liquid in the recoil chamber.

3. The combination according to claim 1 including a first abutment mounted on the piston rod, a spring between the first abutment and the first valve means normally biasing the first valve means toward closed position, a second abutment mounted on the piston rod, and a second spring normally biasing the second valve means toward closed position.

4. In a hydraulic shock absorber, the combination of a first cylinder providing a working chamber, a second cylinder surrounding and spaced from the first cylinder and providing therewith a reserve chamber, end caps welded to the ends of the second cylinder, a piston comprising a single body of metal reciprocable in the first cylinder, base valve means at one end of the first cylinder providing for valve controlled transfer of liquid between the working chamber and the reserve chamber, a cylindrical sleeve secured to the opposite end of the first cylinder, the inner diameter of the sleeve being less than the inner diameter of the first cylinder, the region defined by the sleeve providing a recoil chamber, an end closure secured to the sleeve, a rod connected with the piston extending through openings in the end closure and the adjacent end cap, said piston having a portion of a diameter to be received in the recoil chamber and skirt portion slidably fitting the inner diameter of the first cylinder, first passage means in the piston disposed lengthwise thereof, a first disc valve for said first passage means, second passage means disposed lengthwise in the piston and extending only partially through the piston, transverse passages in the portion of the piston received in the cylindrical sleeve, said transverse passages being radially disposed and in communication with the second passage means, a second disc valve for the second passage means, and resilient means normally biasing the disc valves toward closed position.

5. The combination according to claim 4 wherein the base valve means includes a body member forming a closure for an end of the first cylinder, said body member being of lesser diameter than the interior diameter of the adjacent end cap providing an annular passage, said end cap having a frusto-conically shaped portion, said frusto-conically shaped portion having circumferentially-spaced inwardly-extending raised regions in engagement with the body member, the spaces provided by the raised regions being in communication with the annular passage forming a flow channel for transfer of liquid into and out of the reserve chamber.

6. The combination according to claim 4 wherein the body member of the base valve means has first channel means therein, a valve for said first channel means, second channel means in said body member, a second valve for the second channel means, and resilient means biasing said valves toward closed position.

References Cited

UNITED STATES PATENTS

| | | | |
|---|---|---|---|
| 2,576,637 | 11/1951 | Patriquin | 188—88 |
| 3,204,728 | 9/1965 | Powell | 188—96 |
| 3,213,972 | 10/1965 | Long | 188—96 |

FOREIGN PATENTS

| | | |
|---|---|---|
| 180,681 | 1/1955 | Austria. |
| 111,974 | 9/1964 | Czechoslovokia. |

MILTON BUCHLER, *Primary Examiner.*

FERGUS S. MIDDLETON, GEORGE E. HALVOSA,

*Examiners.*